O. R. TURNER.
HEADLIGHT OPERATING APPARATUS FOR AUTOMOBILES.
APPLICATION FILED FEB. 9, 1909.
935,435.
Patented Sept. 28, 1909.
2 SHEETS—SHEET 2.
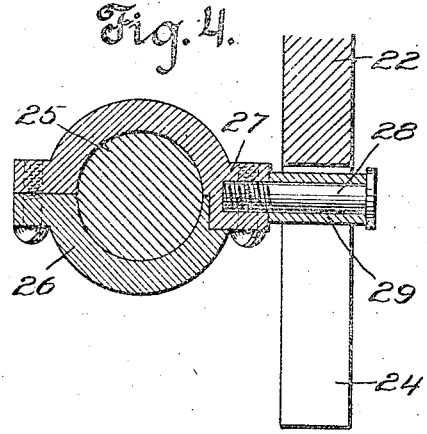
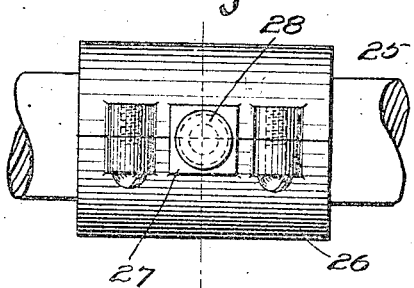
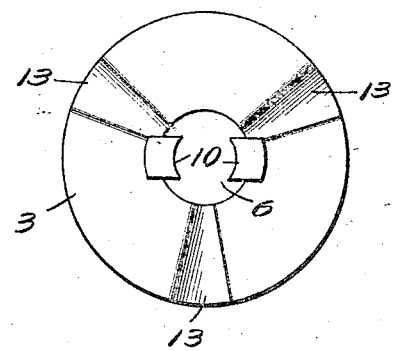
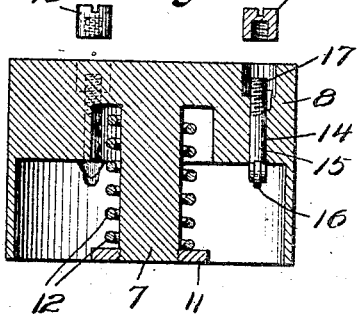
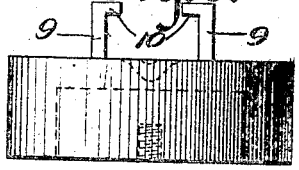
Inventor
Oscar R. Turner.
Witnesses

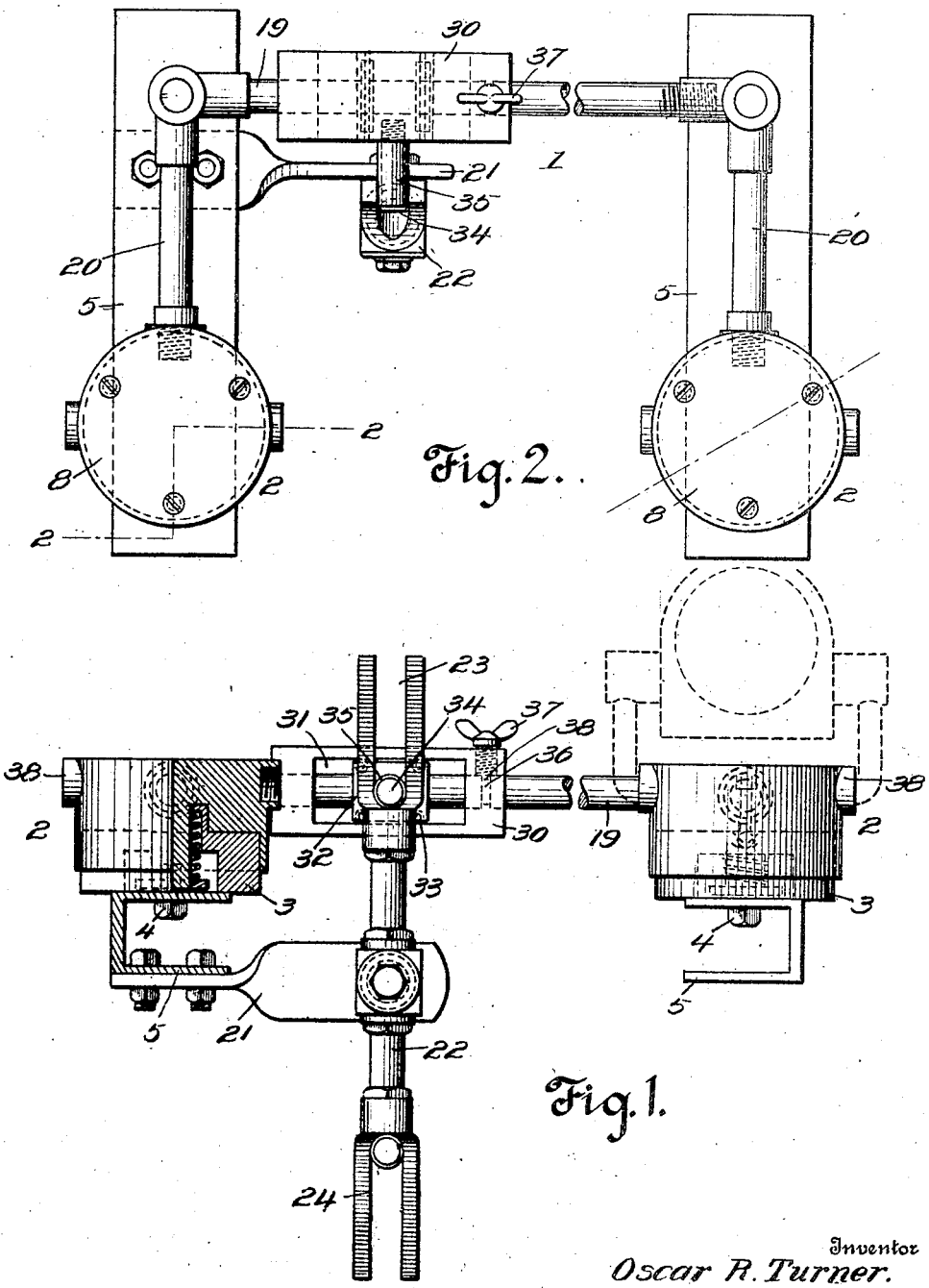

UNITED STATES PATENT OFFICE.

OSCAR R. TURNER, OF BALTIMORE, MARYLAND.

HEADLIGHT-OPERATING APPARATUS FOR AUTOMOBILES.

935,435.　　　Specification of Letters Patent.　Patented Sept. 28, 1909.

Application filed February 9, 1909. Serial No. 476,893.

*To all whom it may concern:*

Be it known that I, OSCAR R. TURNER, a citizen of the United States, residing in the city of Baltimore and State of Maryland, have invented new and useful Improvements in Headlight-Operating Apparatus for Automobiles, of which the following is a specification.

This invention relates to headlight oper10 ating apparatus for automobiles or similar vehicles.

Heretofore in automobiles or the like lamps or headlights have been permanently fixed to the body portion of the automobile or vehicle, and incident to such connection between the automobile and the lamp or headlight it has been impossible for the chauffeur or operator to definitely ascertain whether or not he is making the proper curve, this being due to the fact that the wheels controlled by the steering apparatus have been moved out of the plane of the lamps or headlights, and it is therefore an object of my invention to provide simple and novel apparatus for effectively changing the angular position of the headlights or lamps when the automobile or vehicle is taking a curve, so that the lamps or headlights will be moved to assume a parallel plane with respect to the axles.

A still further object of my invention is to provide means so that the apparatus will only be operated after movement of the axles of the automobile or vehicle beyond a predetermined point, thus allowing the lamps or headlights to remain undisturbed under ordinary circumstances.

A still further object of my invention is to provide simple and novel means for mov40 ing operative connections of my invention into an inoperative position to prevent angular movement of the lamps or headlights during the daytime.

Other objects and advantages will be ap45 parent as the nature of the invention is better set forth, and it will be understood that changes within the scope of the claims may be resorted to without departing from the spirit of the invention.

In the drawings, forming a portion of this specification and in which like numerals of reference indicate similar parts in the several views: Figure 1 is a front elevation of the headlight operating apparatus, parts being shown in sections. Fig. 2 is a top plan view of the complete apparatus. Fig. 3 is a detail vertical section of one element of the headlight support. Fig. 4 is a detail section through the clamp for connecting the steering rod with my improved apparatus. Fig. 5 is a side view of the clamp. Fig. 6 is a side view of another element forming the lamp support. Fig. 7 is a top plan view of a portion of one of the headlight supporting elements. Fig. 8 is a detail side elevation of one of the roller carrying pins.

Referring now more particularly to the drawings, there is shown a lamp or headlight operating apparatus 1 comprising headlight supporting elements 2 comprising lower cylindrical members 3 secured by means of bolts or the like 4 to automobile frame bars 5. The members 3 are provided with centrally located passages 6 which receive depending stems 7 of upper members 8 of said headlight supporting elements. The members 3 are provided with upwardly extending spaced arms 9 having inwardly directed portions 10 at their upper extremities. The stems 7 are provided at their lower ends with clamping nuts 11, and confined between said nuts and the portions 10 of the arms 9 are coil springs 12 for a purpose to be hereinafter more fully described. The members 3 have formed therein upon their upper faces cam grooves or recesses 13 disposed radially with respect to the stems 7. The members 8 are provided with a plurality of vertically disposed passages 14, and keyed in said passages are elements 15 provided at their lower ends with revoluble rollers 16, and at the upper ends the elements 15 are threaded as indicated at 17 to be engaged with interiorly threaded nuts 18. The construction thus described is such that the rollers 16 are yieldingly held in engagement with the upper faces of the members 3 between the cam grooves or recesses 13.

Rearwardly of the elements 2 is shown a bar or rod 19 which is pivotally connected at its outer ends to the rear ends of rods or bars 20. The rods 20 are fixed at their forward ends to the members 8 of the elements 2 so that in horizontal movement of the bar or rod 19 the bars or rods 20 will be simultaneously moved to lie in parallel relation to each other. One of the bars 5 of the automobile or vehicle frame has secured thereto in any suitable manner a bracket 21 to which is pivotally secured an oscillatory member 22 having a forked upper end 23 and a similar lower end 24. An automobile steering rod is shown at 25 and has secured thereto a clamp 26 having at one side a lug 27 with which is engaged a pin 28 having loosely mounted thereon an anti-friction roller 29. The rod or bar 19 is provided with a guide member 30 provided with a horizontally disposed rectangular slot 31. The rod or bar 19 has slidably mounted thereon a block 32 provided with rollers 33 adapted to travel upon the upper and lower walls of the slot 31. The block 32 has removably secured thereto a pin 34 upon which is mounted a roller 35 similar to the roller 29. The roller 29 is disposed between the arms of the forked lower end 24 of the oscillatory member 22, and the roller 35 is disposed between the arms of the forked portion 23 of said member 22. The rod or bar 19 is preferably provided with an annular groove 36, and as shown the guide member 30 is provided with an adjusting screw 37 having a reduced portion 38 to be engaged between the walls of the groove portion 36 of the rod or bar 19 so that the said guide member 30 can be effectively held upon the rod or bar 19 against longitudinal sliding movement. The members 8 of the elements 2 are provided with interiorly threaded bosses 38 adapted to receive headlight-clamping rods or the like, not shown.

In operation, it will be seen that when the steering rod 25 is actuated to change the angle of the wheels with respect to the body of the automobile or vehicle movement imparted to the clamp 26 will oscillate the member 22, and in view of the connections between the block 32 and the said member 22 the former will be moved upon the bar or rod 19 until it reaches one of the end walls of the slot 31, after which further oscillatory movement of the member 22 will move the bar or rod 19 horizontally, and in view of the pivotal connections between said bar or rod 19 and the rods 20, the said last named rods will be simultaneously moved to lie in parallel relation to each other and in a plane with the wheels of the automobile or vehicle which are actuated by the steering rod 25. When the rods 20 have been thus actuated the members 8 of the elements 2 will of course be revolved and the roller carrying element 15 will be moved so that the roller 16 can be effectively placed in the cam grooves or recesses 13 formed in the members 3 of the elements 2, the springs 12 serving to properly position the roller 16 and to yieldingly hold them in said grooves or recesses, thus causing the headlights or lamps to remain in one position until the steering apparatus or rod 25 thereof is actuated to again change the position of the automobile steering wheels. Should it be desired to throw the headlight operating apparatus into inoperative position, the set screw 37 is released from the rod or bar 19, and the guide element 30 revolved manually upon the rod or bar 19 to throw the roller 35 out of engagement with the forked upper end of the oscillatory member 22.

I claim:—

1. In combination with a vehicle steering rod, and revoluble headlight supporting elements, of a rod pivotally connected at its ends to said elements, a guide element upon said rod, a guide block, said guide element having a slot formed therein for receiving said guide block, an oscillatory member connecting the steering rod with the guide block, and means for allowing the guide element to be rotated upon said rod to disengage the oscillatory member from said guide block.

2. An apparatus of the class described comprising headlight supporting elements, each element comprising a member adapted to be secured to a vehicle frame and provided with a plurality of upwardly extending arms, and a second member revolubly connected with the fixed member, each of said fixed members having a plurality of grooves formed therein and radiating from the center thereof, rollers carried by the revoluble members, depending stems carried by the revoluble members provided at their lower ends with nuts, and springs confined between said nuts and portions of said upwardly extending arms carried by the fixed members.

3. An apparatus of the class described comprising revoluble headlight supporting elements, a rod pivotally connected at its ends to said elements, a guide element upon said rod, said guide element having a slot formed therein, and steering rod actuated means movable in the slot and adapted to engage the guide element to actuate said first named rod.

4. An apparatus of the class described comprising revoluble headlight supporting means, a rod connected at its ends to said means, a guide block carried by said rod and normally fixed thereto, steering rod actuated means slidably mounted upon the rod adapted to be engaged with the guide block to actuate the said rod so as to revolve the said headlight supporting means, and means carried by the guide block for engaging the rod for holding the guide block in its operative position, said means being adapted to be released from the rod so that the guide block can be moved into an inoperative position.

5. Apparatus of the class described comprising revolubly mounted headlight supporting means, a rod pivotally connected at its ends to said means, a guide block mounted upon the rod and provided with a longitudinally extending slot, a slidable and revoluble block upon the said rod and disposed in the slot formed in said guide block, and steering rod actuated means for controlling the movement of said second named block and for engaging the same with said guide block.

In testimony whereof I affix my signature in presence of two witnesses.

OSCAR R. TURNER.

Witnesses:
J. P. CURLEY,
L. H. MAYER, Jr.